United States Patent
Chan et al.

(10) Patent No.: US 12,019,240 B2
(45) Date of Patent: Jun. 25, 2024

(54) IMAGING APPARATUS INTEGRATED WITH DISPLAY FOR HEAD-MOUNTED DISPLAY

(71) Applicant: Hong Kong Applied Science and Technology Research Institute Company Limited, Hong Kong (CN)

(72) Inventors: Kin Lung Chan, Hong Kong (CN); Ying Wang, Shenzhen (CN); Zhuanyun Zhang, Hong Kong (CN)

(73) Assignee: Hong Kong Applied Science and Technology Research Institute Company Limited, Hong Kong (CN)

(*) Notice: Subject to any disclaimer, the term of this patent is extended or adjusted under 35 U.S.C. 154(b) by 561 days.

(21) Appl. No.: 17/395,858

(22) Filed: Aug. 6, 2021

(65) Prior Publication Data
US 2023/0045672 A1    Feb. 9, 2023

(51) Int. Cl.
*G02B 27/01* (2006.01)
*G02B 6/04* (2006.01)

(52) U.S. Cl.
CPC .......... *G02B 27/0172* (2013.01); *G02B 6/04* (2013.01); *G02B 2027/0138* (2013.01)

(58) Field of Classification Search
CPC ...... G02B 6/0066; G02B 6/0068; G02B 6/06; G02B 6/10; G02B 27/01; G02B 27/09; G02B 27/10; G02B 27/143; G02B 27/017; G02B 27/0138; G02B 27/0172; G02B 27/0178; G02B 27/0093; G02B 2027/014; G02B 2027/0138; G02B 2027/0174; G02B 2027/0178
See application file for complete search history.

(56) References Cited

U.S. PATENT DOCUMENTS

| | | | |
|---|---|---|---|
| 8,330,846 B2 | 12/2012 | Miyoshi et al. |
| 9,360,935 B2 | 6/2016 | Chan et al. |
| 9,442,292 B1 | 9/2016 | Gao et al. |
| 10,032,074 B2 | 7/2018 | Publicover et al. |
| 10,257,507 B1 | 4/2019 | Trail |

(Continued)

FOREIGN PATENT DOCUMENTS

| | | |
|---|---|---|
| CN | 108885341 A | 11/2018 |
| CN | 109765690 A | 5/2019 |
| CN | 111077672 A | 4/2020 |

*Primary Examiner* — Sultan Chowdhury
(74) *Attorney, Agent, or Firm* — S&F/WEHRW

(57) ABSTRACT

An apparatus installed in a head-mounted display (HMD) has a coupling prism formed by packing diagonally-reflective (DR) prisms together. Each DR prism has an internal diagonal plane that is at least partially reflective. A captured image of eye or environmental scene received by a DR prism is reflected to an image-leaving end surface thereof. Image-leaving end surfaces of all DR prisms are oriented along a same direction to optically multiplex the captured images to create a multi-channel image. An imaging sensor on the coupling prism images the multi-channel image, avoiding inter-channel interference caused by spillover of captured-image signals while allowing one imaging sensor instead of multiple ones to image the captured images. A micro display displays a visible image to one DR prism, whose internal diagonal plane reflects the visible image along a direction towards an eye. Hence, the apparatus also enables image displaying to a HMD wearer.

18 Claims, 13 Drawing Sheets

(56) References Cited

U.S. PATENT DOCUMENTS

| | | |
|---|---|---|
| 10,845,594 B1 | 11/2020 | Lam et al. |
| 10,860,851 B2 | 12/2020 | Yeh et al. |
| 2014/0375790 A1* | 12/2014 | Robbins ............... G02B 27/017 |
| | | 348/78 |
| 2018/0173303 A1 | 6/2018 | Liu et al. |
| 2018/0246590 A1 | 8/2018 | Trail et al. |
| 2018/0292655 A1 | 10/2018 | Smithwick et al. |
| 2019/0056599 A1* | 2/2019 | Reshidko ........... G02B 27/0172 |
| 2019/0094444 A1* | 3/2019 | Ma .................... G02B 27/0081 |
| 2020/0192285 A1 | 6/2020 | Kim et al. |

\* cited by examiner

IMAGING APPARATUS INTEGRATED WITH DISPLAY FOR HEAD-MOUNTED DISPLAY

TECHNICAL FIELD

The present disclosure generally relates to an apparatus installable in a HMD and having an imaging functionality and optionally an image-displaying functionality. In particular, the present disclosure relates to such apparatus in which a single imaging sensor instead of a plurality of imaging sensors is used to image a plurality of views for at least saving a manufacturing cost, where the plurality of views may include views of a user's eyes and views of the user's environment.

BACKGROUND

In a HMD, internal sensing and external sensing are required to support various functions related to user interaction, user identification, display brightness control, display focus control, foveated rendering, multiplayer interaction, visual experience enhancement, etc. Internal sensing is related to sensing biological/biometric information of a user, such as eye features (iris patterns, retinal images, etc.) and facial structures (lip shapes, eyebrow positions, etc.). Particularly, one or more images of eye of the user can be used to calculate an eye-gazing direction. External sensing means sensing objects in an external environment observable by the user, such as an identity of a person in front of the user.

Internal sensing and external sensing are often carried out by analyzing images of facial features (e.g., eyeballs) of the user and images of a surrounding scene observed by the user, respectively. In certain situations, images of the same object viewed from different angles are required for extracting more useful information. Such information may find applications in, for example, 3D reconstruction of the object for higher resolution and tracking accuracy. Conventionally, multiple imaging sensors installed at different locations of the HMD are required for taking multiple views. However, the HMD cannot be easily reduced in size and weight. The power consumption is also increased. Installing multiple imaging sensors also leads to an increased manufacturing cost of the HMD. Since images taken from different imaging sensors is collectively analyzed, regular calibration of the different imaging sensors is required and it is an operational burden. There is also a high latency in extracting useful information from different images due to differences among different imaging sensors in sensor specification and in manufacturing variance. It is desirable to reduce a required number of imaging sensors installed and operated in the HMD without reducing the number of views for image taking.

FIG. 1 depicts an optical arrangement disclosed in U.S. Pat. No. 8,330,846 and used in a HMD 100 for projecting an eye view 151 and a scene view 152 onto a single imaging sensor 110 through an imaging lens 111 such that the two views 151, 152 can be simultaneously imaged by the imaging sensor 110. The optical arrangement includes a convex reflective mirror 120 positioned above the imaging lens 111 for reflecting the eye view 151 towards the imaging sensor 110 such that traveling directions of the two views 151, 152 towards the imaging sensor 110 appear to be parallel. As a result, the imaging sensor 110 receives a multiplexed view, one half of which is the eye view 151, another one of which is the scene view 152. Although the two views 151, 152 are multiplexed, the resultant multi-channel view suffers from ICI. Lens flare can arise when a bright light beam enters into the imaging lens 111, making the whole multiplexed view much brighter and thereby raising an average brightness level of the multiplexed view such that some details in the multiplexed view are less visible. When the scene view 152 is much brighter than the eye view 151 during. e.g., daytime, the average brightness level of the eye view 151 is raised and details therein are less visible. Effectively, the energy of the scene view 152 is leaked to the eye view 151, causing ICI. Similarly, the energy of the eye view 151 is leaked to the scene view 152 when the eye view 151 is much brighter than the scene view 152, introducing ICI to the scene view 152.

Apart from suffering from ICI, the optical arrangement disclosed in U.S. Pat. No. 8,330,846 does not support 3D reconstruction of biometric features since the imaging sensor 110 only captures one internal-sensing view (i.e. the eye view 151) with low internal sensing resolution/accuracy. It is also noticed that the optical arrangement cannot share the same optical path for both sensing and image displaying. Supporting internal sensing, external sensing and image displaying altogether is desirable.

There is a need in the art for an optical arrangement that enables plural single-channel images to be optically multiplexed to form a multi-channel image such that one imaging sensor is sufficient to image all the single-channel images while the ICI on the multi-channel image is reduced, minimized or avoided. Preferably, the optical arrangement also addresses the need for taking multiple views of an object in internal or external sensing for 3D reconstruction of the object. It is desirable if the optical arrangement is also capable of image displaying.

SUMMARY

A first aspect of the present disclosure is to provide an apparatus having at least a functionality of imaging a plurality of views.

The apparatus comprises a coupling prism and an imaging sensor. The coupling prism is used for optically multiplexing plural single-channel images each created by capturing a respective view to thereby form a multi-channel image. The coupling prism comprises a plurality of DR prisms. Respective DR prisms in the plurality of DR prisms are packed together. An individual DR prism is shaped as a rectangular cuboid having a plurality of end surfaces. The individual DR prism comprises an internal diagonal plane at least partially reflective for reflecting a respective single-channel image received through an image-receiving end surface of the individual DR prism towards an image-leaving end surface thereof. Respective image-leaving end surfaces of the DR prisms are oriented to a same direction and aligned together on a same plane for collectively creating the multi-channel image and a substantially flat surface from which the multi-channel image exits the coupling prism. The imaging sensor overlies the substantially flat surface for imaging the multi-channel image upon the multi-channel image exiting the coupling prism. It thereby avoids inter-channel interference caused by spillover of the single-channel images on the multi-channel image to occur while allowing a single imaging sensor instead of a plurality of imaging sensors to image the plurality of views.

Preferably, the individual DR prism is shaped as a cube, and all the respective DR prisms in the plurality of DR prisms are of same size.

The individual DR prism may comprise two right-angle prisms joined at hypotenuse faces thereof. The hypotenuse faces may be coated with a material before joining together, such as a metal, a polymer electrolyte, etc. In certain embodiments, the individual DR prism is a beam splitter.

In certain embodiments, the apparatus further comprises a plurality of light transmission devices and a plurality of collimating optical devices. An individual light transmission device comprises a near end and a distal end. The near end is optically coupled to the image-receiving end surface of a corresponding DR prism selected from the plurality of DR prisms. The individual light transmission device is used for optically transmitting a corresponding single-channel image intended for reception by the corresponding DR prism from the distal end to the near end such that the corresponding single-channel image is receivable by the corresponding DR prism. The distal end of the individual light transmission device is optically coupled to a respective collimating optical device configured to capture a corresponding view selected from the plurality of views for forming the corresponding single-channel image.

The individual light transmission device may be realized by a waveguide, such as a surface relief waveguide, a volume holographic waveguide, or any waveguide determined appropriate by those skilled in the art. The individual light transmission device may also be an optical fiber bundle.

In certain embodiments, the respective collimating optical device is a first assembly of one or more lenses for capturing the corresponding view.

In certain embodiments, the apparatus further comprises an IR light source. The IR light source is used for generating IR light to illuminate one or more views selected from the plurality of views. Optionally, the apparatus further comprises an optical fiber connected to the IR light source for transmitting the IR light to one of the selected one or more views.

In certain embodiments, a first certain DR prism in the plurality of DR prisms is dedicated to capture a prism-seeing view, where the prism-seeing view is a view located in front of the image-receiving end surface of said first certain DR prism. Remaining DR prisms in the plurality of DR prisms other than said first certain DR prism are optically coupled to respective light transmission devices.

In certain embodiments, the apparatus further comprises a second assembly of one or more lenses optically coupled to the image-receiving end surface of said first certain DR prism for capturing the prism-seeing view.

The disclosed apparatus is usable in implementing a HMD wearable by a user.

In certain embodiments of the HMD, the HMD comprises a sensing device for imaging plural eye views. The sensing device is realized by an appropriate embodiment of the apparatus disclosed above.

In certain embodiments of the HMD, the HMD comprises first and second sensing devices. The first sensing device is used for imaging a first plurality of eye views from a right eye of the user. The second sensing device is used for imaging a second plurality of eye views from a left eye of the user. Each of the first and second sensing devices is individually realized by an appropriate embodiment of the apparatus disclosed above.

A second aspect of the present disclosure is to provide an additional functionality of image displaying to the apparatus disclosed above in the first aspect of the present disclosure.

The apparatus further comprises a micro display for generating a visible image. The micro display overlies an additional image-receiving end surface of a second certain DR prism selected from the plurality of DR prisms. As a result, the visible image received by said second certain DR prism is reflected towards an additional image-leaving end surface of said second certain DR prism. In said second certain DR prism, the additional image-receiving end surface is opposite to the image-receiving end surface, and the additional image-leaving end surface is opposite to the image-leaving end surface.

The disclosed apparatus is usable in implementing a HMD wearable by a user. The HMD comprises first and second integrated-sensing-and-displaying devices. The first integrated-sensing-and-displaying device is used for imaging a first plurality of eye views from a right eye of the user, and a first scene view visually seen from a first direction, and for displaying a first visible image to the right eye. The second integrated-sensing-and-displaying device is used for imaging a second plurality of eye views from a left eye of the user, and a second scene view visually seen from a second direction different from the first direction, and for displaying a second visible image to the left eye. Each of the first and second integrated-sensing-and-displaying devices is individually realized by any of the embodiments of the apparatus disclosed in the second aspect of the present disclosure. Furthermore, the HMD further comprises first and second reflectors. The first reflector is arranged to be positioned in front of the right eye for reflecting the first visible image exited from the additional image-leaving end surface of the first integrated-sensing-and-displaying device towards the right eye. The second reflector is arranged to be positioned in front of the left eye for reflecting the second visible image exited from the additional image-leaving end surface of the second integrated-sensing-and-displaying device towards the left eye.

Other aspects of the present disclosure are disclosed as illustrated by the embodiments hereinafter.

Figure 1:
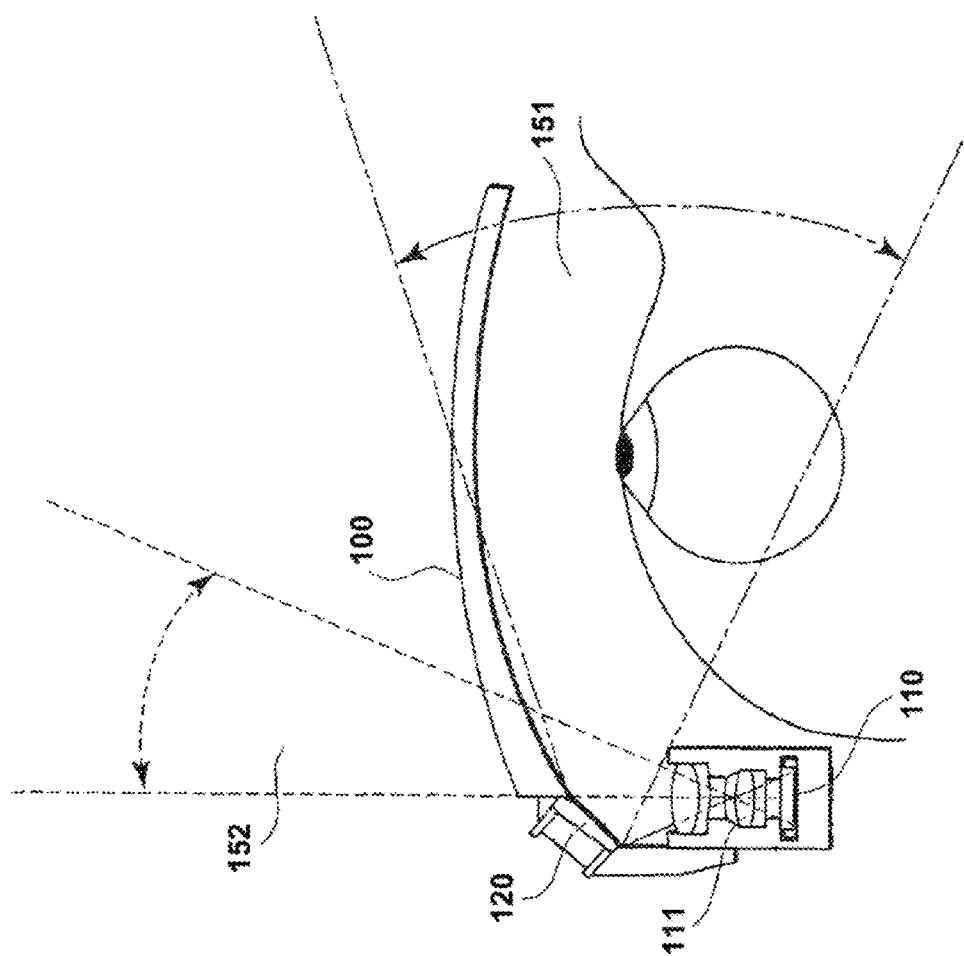
FIG. 1 depicts a prior-art HMD configured to simultaneously image a scene view and an eye view by using a single imaging sensor.

Skilled artisans will appreciate that elements in the figures are illustrated for simplicity and clarity and have not necessarily been depicted to scale.

DETAILED DESCRIPTION

As used herein in the specification and appended claims, the term "avoid" or "avoiding" refers to any method to partially or completely preclude, avert, obviate, forestall, stop, hinder or delay the consequence or phenomenon following the term "avoid" or "avoiding" from happening. The term "avoid" or "avoiding" does not mean that it is necessarily absolute, but rather effective for providing some degree of avoidance or prevention or amelioration of consequence or phenomenon following the term "avoid" or "avoiding".

As used herein, "a collimating optical device" is an optical device for generating an output image in seeing a view, where the optical device restricts a FOV of the view in forming the output image. Hence, light beams emitted from outside the FOV are not captured by the collimating optical device in forming the output image. Examples of the collimating optical device include an ordinary camera lens, a miniaturized camera lens, a telescope, a lens group formed by assembling plural lenses together, etc.

As used herein, "a simple prism" is a transparent optical element with flat surfaces that refract light, where the optical element is transparent at least over the visible spectrum. A conventional triangular prism for dispersing a white light beam into a rainbow of color light beams is a simple prism.

It is also used herein in the specification and appended claims that "a prism" is either a simple prism or a compound prism. A compound prism is formed by integrating plural simple prisms together. An example of a prism is a beam splitter formed by gluing two triangular simple prisms on hypotenuse faces thereof with a judiciously selected gluing material such that at an incident light beam entering into an interface formed by the two hypotenuse faces is partially reflected and partially transmitted for splitting the incident light beams into two outgoing light beams traveling in different directions.

Disclosed herein are an apparatus having a functionality of imaging a plurality of views, and a HMD having one or more sensing devices each implemented as the aforementioned apparatus for capturing eye-gazing signals of a user and environmental signals from the vicinity of the user. Optionally, the apparatus is provided with an additional functionality of displaying a visible image. The inclusion of this additional feature enables the HMD to sense the user for getting user inputs and display images to the user, allowing the HMD to increase the degree of user interaction when the user uses the HMD.

Although the disclosed apparatus is particularly useful for a HMD, the present disclosure is not limited only to using the disclosed apparatus in the HMD. The disclosed apparatus may be installed in a wearable device other than a HMD for multi-view image capturing and optionally for image displaying. Such wearable device may be, for example, a medical device for psychological analysis, where the medical device performs sensing of facial structures of a user, and multi-directional monitoring of the user's surrounding environment.

Figure 2:
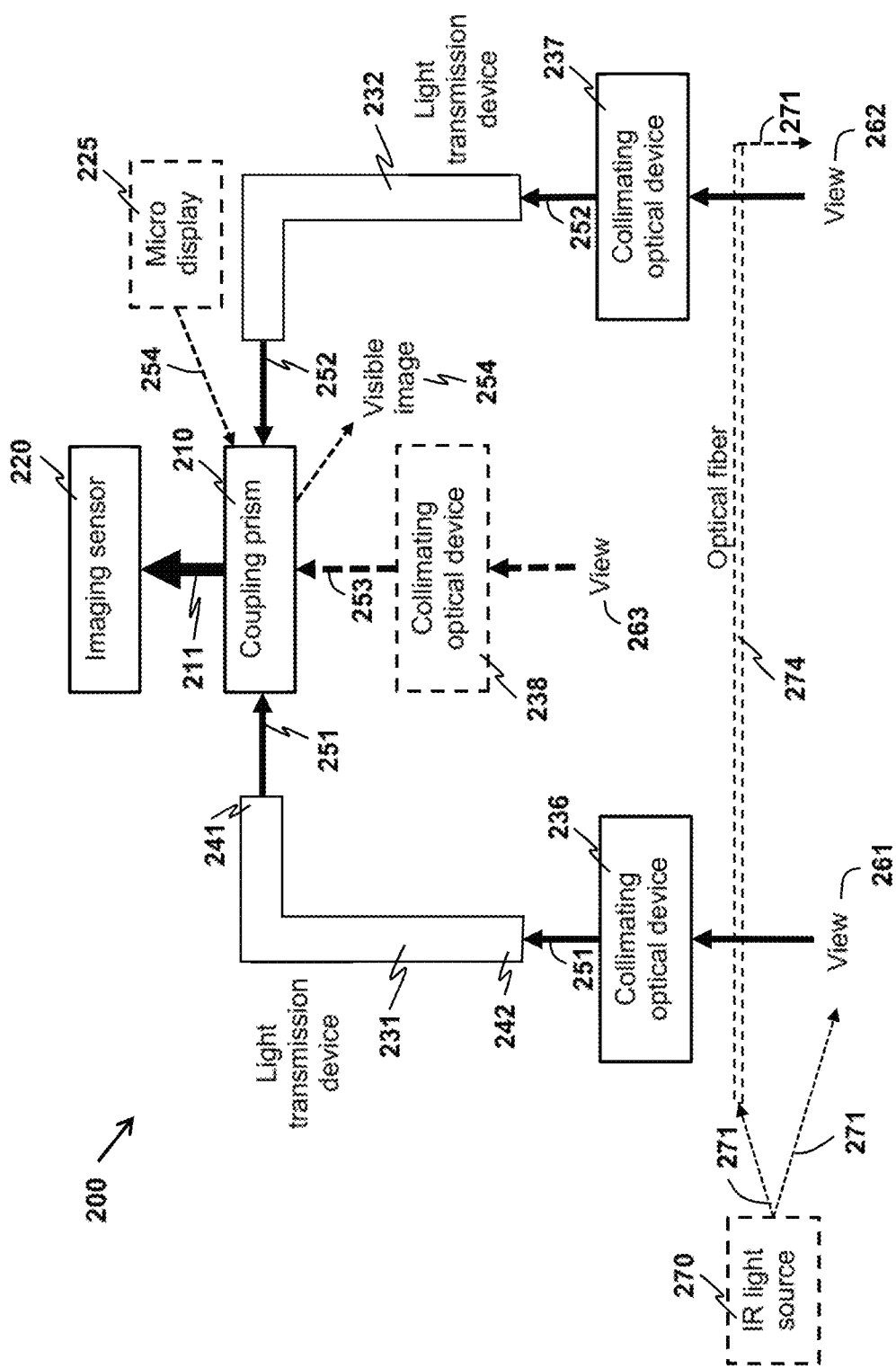
FIG. 2 depicts a schematic diagram of an exemplary apparatus as disclosed herein for imaging a plurality of views and optionally displaying a visible image, where the apparatus includes a coupling prism for optically multiplexing plural single-channel images into a multi-channel image.

The disclosed apparatus is illustrated with the aid of FIG. 2, which depicts a schematic diagram of an exemplary apparatus 200 for imaging a plurality of views and optionally displaying a visible image 254. Preferably, the apparatus 200 is installable in a HMD. Without loss of generality, a specific case that the apparatus 200 is used in the HMD is considered hereinafter for illustrating the apparatus 200.

The plurality of views may include views of a user's eyes, views of facial expression, external views of surrounding environment, etc. The views of the eyes may include views of a selected eye as seen from a plurality of viewing directions. As a first non-limiting example to be used for illustrating the apparatus 200, the plurality of views consists of a first view 261, a second view 262 and a third view 263, all of which are distinct. The three views 261, 262, 263 are respectively captured by the apparatus 200 to form three single-channel images 251, 252, 253, namely, a first single-channel image 251, a second single-channel image 252 and a third single-channel image 253. In a second non-limiting example, the third view 263 is not required to be imaged and the plurality of views consists only of the first and second views 261, 262.

The core part of the apparatus 200 is a coupling prism 210 advantageously used for optically multiplexing the single-channel images 251-253 to thereby form a multi-channel image 211. The coupling prism 210 is optically coupled to an imaging sensor 220 used for imaging the multi-channel image 211. As a useful result, it allows a single imaging sensor instead of a plurality of imaging sensors to image the plurality of views 261-263.

Figure 3A:
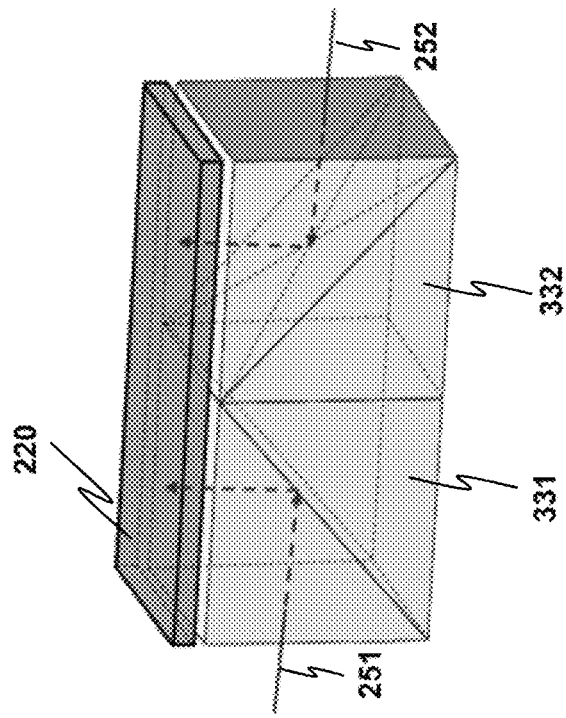
FIG. 3A depicts a first embodiment of the coupling prism, which is formed by three DR prisms, where disposition of an imaging sensor with respect to this coupling prism for imaging the multi-channel image is also shown.
Figure 3B:
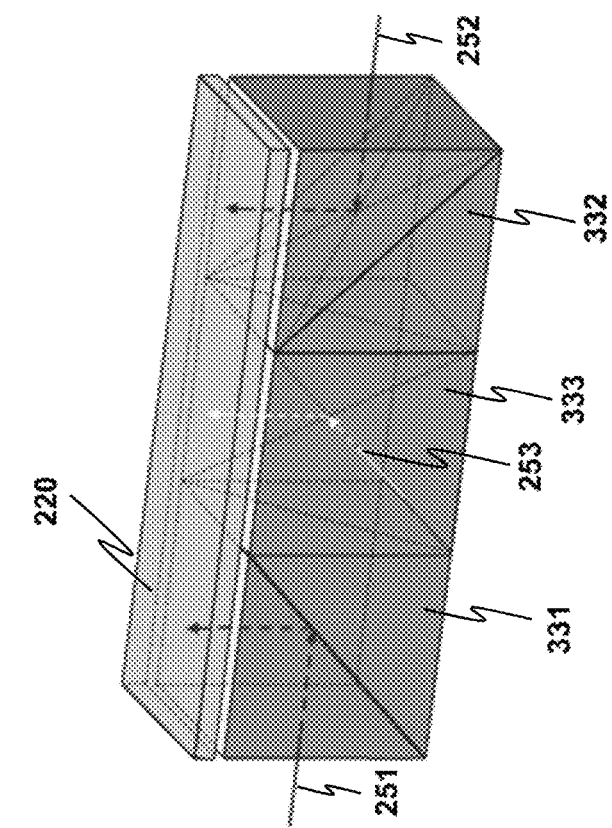
FIG. 3B depicts a second embodiment of the coupling prism, which is formed by two DR prisms, where disposition of the imaging sensor with respect to this coupling prism for imaging the multi-channel image is also shown.

FIGS. 3A and 3B depict two embodiments of the coupling prism 210. In FIG. 3A, a first coupling prism 210a is formed by three optical elements 331-333 for optically multiplexing the first, second and third single-channel images 251-253 arrived from three different directions. In FIG. 3B, a second coupling prism 210b is formed by two optical elements 331, 332 for optically multiplexing the two single-channel images 251-252 arrived from two different directions. Details of the optical elements 331-333 will be elaborated later. The difference between the first and second coupling prisms 210a. 210b is in the number of single-channel images that are multiplexed and presented to the imaging sensor 220. Those skilled in the art will appreciate that other realizations of the coupling prism 210 for accommodating different numbers of single-channel images can be readily designed by varying the number of optical elements.

Each of the optical elements 331-333 is named as a DR prism. It follows that the coupling prism 210 comprises a plurality of DR prisms. Specifically, the first coupling prism 210a is formed by packing together DR prisms 331-333. Similarly, the second coupling prism 210b is formed by packing together DR prisms 331-332. As used herein. "packing together respective DR prisms of a plurality of DR prisms" means that immediately-adjacent neighboring DR prisms in the plurality of DR prisms are placed in contact, or attached together, or glued together, or integrated together.

In the apparatus 200, an advantageous setting is that the imaging sensor 220 overlies the coupling prism 210 as illustrated in FIGS. 3A and 3B for the first and second coupling prisms 210a. 210b. It follows that the imaging sensor 220 receives the multi-channel image 211 upon the multi-channel image 211 exiting the coupling prism 210. As the imaging sensor 220 and the coupling prism 210 are located close to each other, spillover of signal energy from one single-channel image to its adjacent single-channel image as a result of (slight) divergence in light-beam propagation direction of different single-channel images in the multi-channel image 211 is typically insignificant. It thereby avoids ICI caused by the spillover to occur while allowing the imaging sensor 220 instead of a plurality of imaging sensors to image multiple single-channel images, which are multiplexed in the multi-channel image 211. Although the imaging sensor 220 is arranged to be positioned on or over the coupling prism 210, it is possible that one or more (thin) optical components are placed in between the imaging sensor 220 and the coupling prism 210 for performing optical functions considered appropriate by those skilled in the art, such as optical filtering.

Figure 4:
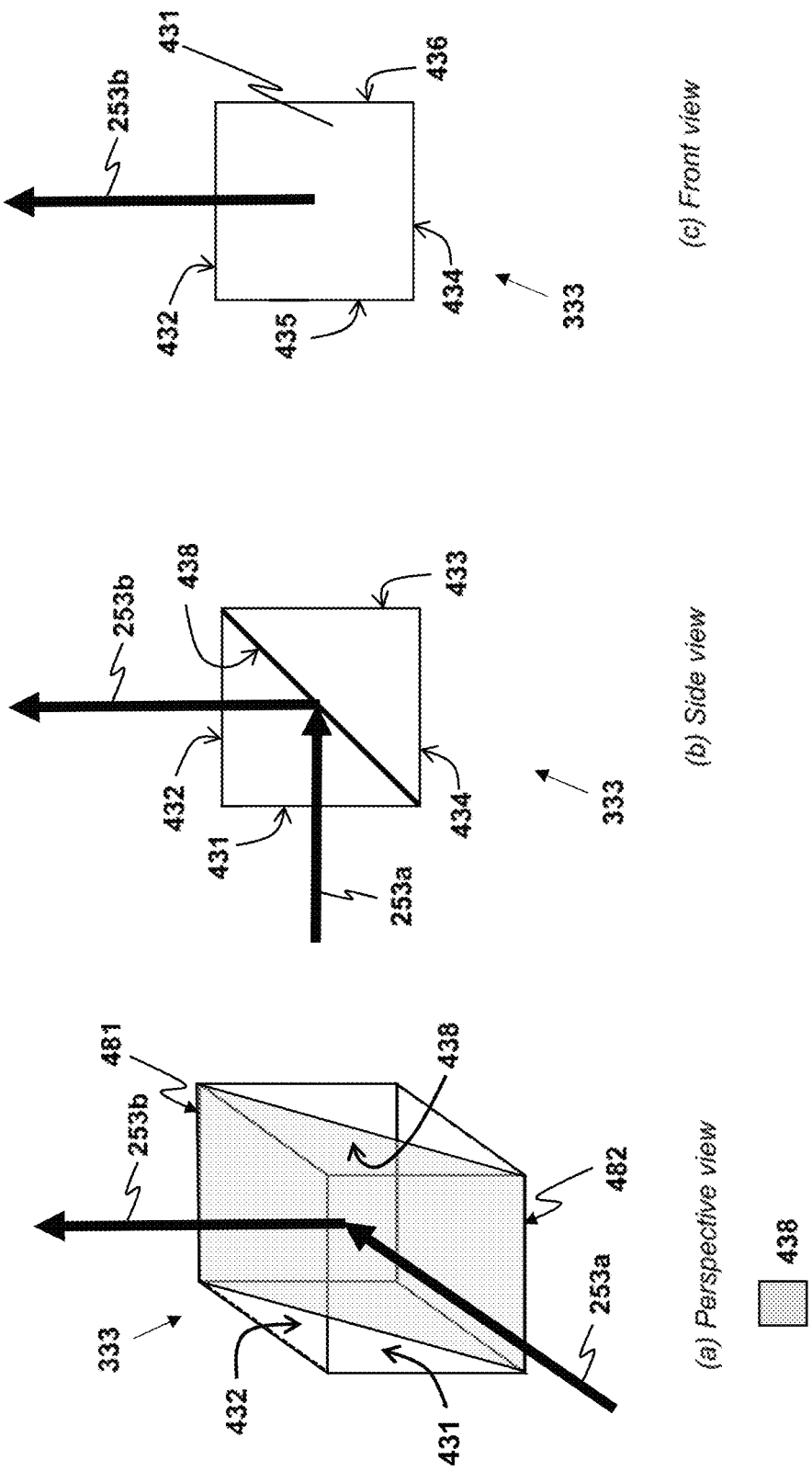
FIG. 4 depicts a perspective view, a side view and a front view of an exemplary DR prism used in forming the coupling prism.

Without loss of generality, consider the DR prism 333 as an exemplary DR prism used in forming the coupling prism 210. FIG. 4 depicts a perspective view, a side view and a front view of the DR prism 333. The DR prism 333 is shaped as a rectangular cuboid having a plurality of end surfaces 431-436. In certain embodiments, the DR prism 333 is shaped as a cube such that all the end surfaces 431-436 are squares.

One important property of the DR prism 333 is that the DR prism 333 comprises an internal diagonal plane 438. The internal diagonal plane 438 is located inside the DR prism 333, and is a plane spanning from a first edge 481 of the DR prism 333 to a second edge 482 thereof, where the second edge 482 is diagonally opposite to the first edge 481. Denote an image-receiving end surface 431 of the DR prism 333 as an end surface through which the third single-channel image 253 (referred to as an incoming third single-channel image 253a for clarity) enters into the DR prism 333. The internal diagonal plane 438 is at least partially reflective for reflecting the incoming third single-channel image 253a towards an image-leaving end surface 432 of the DR prism 333. That is, the image-leaving end surface 432 is an end surface from which the third single-channel image 253 (referred to as an outgoing third single-channel image 253b for clarity) exits the DR prism 333. Preferably, the internal diagonal plane 438 is totally reflective such that the incoming third single-channel image 253a incident on the internal diagonal plane 438 is totally reflected towards the image-leaving end surface 432.

Figure 5:
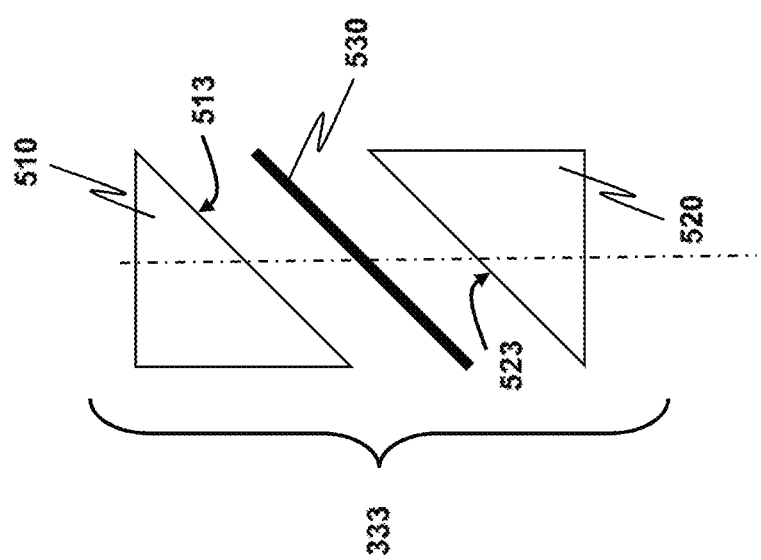
FIG. 5 depicts an exploded side view of the exemplary DR prism in accordance with certain embodiments of the present disclosure for illustrating that the DR prism may be formed by two right-angle prisms.

Practically, the DR prism 333 may be integrally formed by two simple prisms that are triangular in shape. FIG. 5 depicts an exploded side view of the DR prism 333 in accordance with certain embodiments of the present disclosure. The DR prism 333 comprises a first right-angle prism 510 and a second right-angle prism 520. The first right-angle prism 510 has a first hypotenuse face 513, and the second right-angle prism 520 has a second hypotenuse face 523. The first and second right-angle prisms 510, 520 are joined together on their hypotenuse faces 513, 523. Usually, a thin sheet 530 of interfacing material is present between the two hypotenuse faces 513, 523 for assisting creation of the internal diagonal plane 438 with desired reflectivity properties and/or joining the two right-angle prisms 510, 520. In a first embodiment, the interfacing material of the thin sheet 530 is a suitable metal, such as aluminum, for achieving a high reflectivity of the internal diagonal plane 438. The hypotenuse faces 513, 523 are metal-coated before the two right-angle prisms 510, 520 are joined. Usually, the two right-angle prisms 510, 520 are made of glass in order to withstand a high temperature during metal coating. In a second embodiment, the hypotenuse faces 513, 523 are first metal-coated and then the two right-angle prisms 510, 520 are joined by an adhesive on the metal-coated hypotenuse faces 513, 523. As a result, the thin sheet 530 is made of a composite material. In a third embodiment, the interfacing material is a transparent material having a refractive index sufficiently lower than a refractive index of a material used to make the two right-angled prisms 510, 520 such that total internal reflection occurs at the internal diagonal plane 438 to reflect the incoming third single-channel image 253a. The interfacing material may simply be air. Alternatively, a solid polymer-based interfacing material having a sufficiently low refractive index may be used since this interfacing material may also be used as an adhesive in joining the two right-angle prisms 510, 520. The polymer-based interfacing material may be an appropriate polymer electrolyte. In a fourth embodiment, the interfacing material is selected such that the DR prism 333 is a beam splitter. By this embodiment, the incoming third single-channel image 253a is only partially reflected at the internal diagonal plane 438. Usually, the interfacing material is a polymer-based material selected to achieve frustrated total internal reflection at the internal diagonal plane 438 as well as to glue the two right-angle prisms 510, 520. The polymer-based material may be an appropriate polymer electrolyte. Other realizations of the DR prism 333 from the two right-angle prisms 510, 520 are possible.

Figure 6:
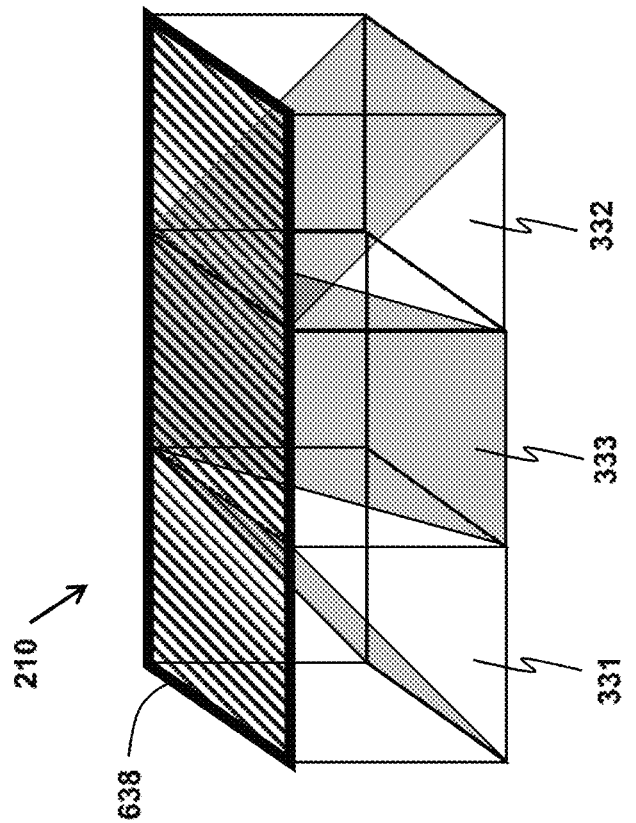
FIG. 6 depicts a perspective view of the coupling prism of FIG. 3A.
Figure 7:
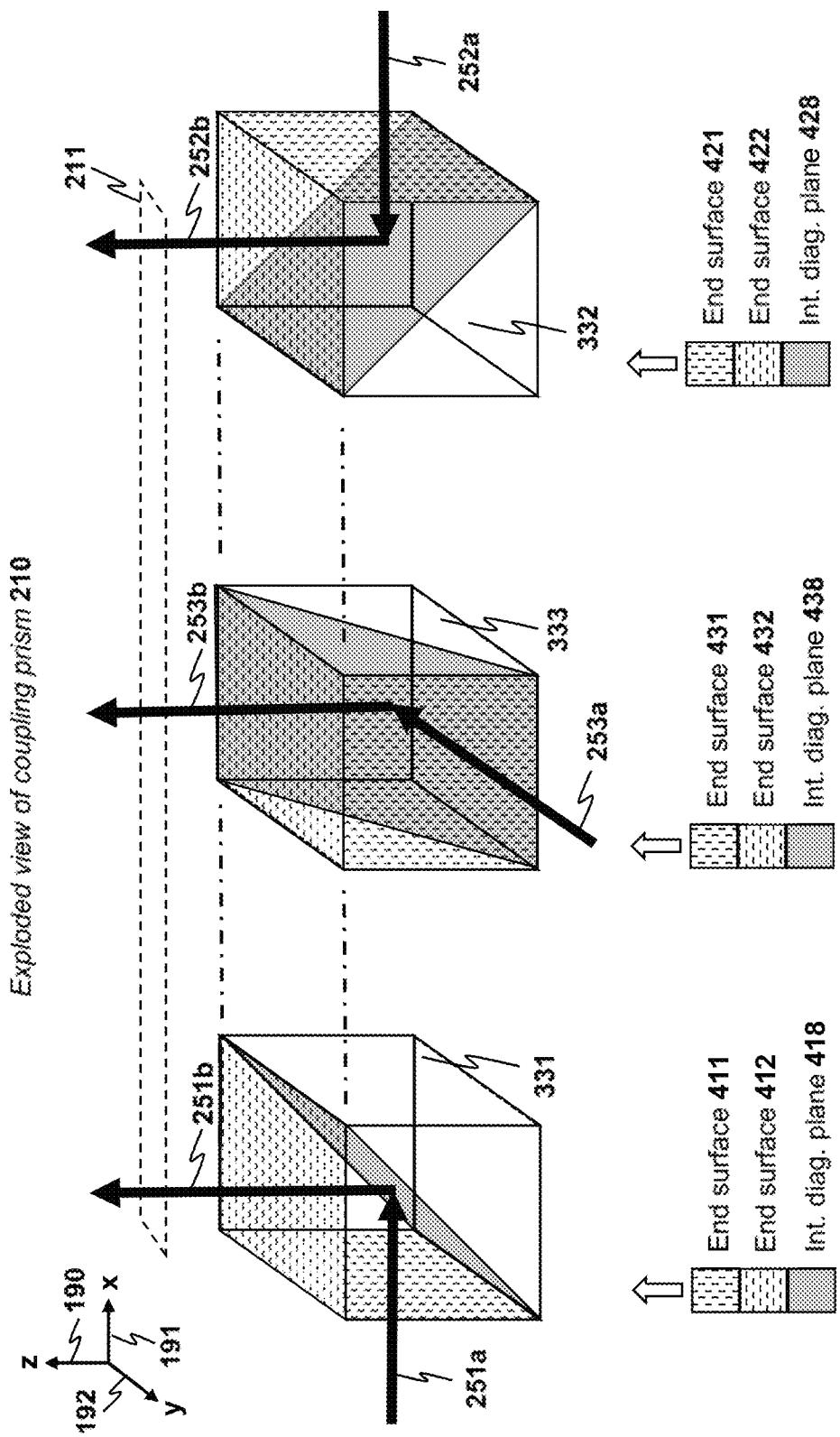
FIG. 7 depicts an exploded view of the coupling prism of FIG. 6.

Formation of the coupling prism 210 from constituent DR prisms is illustrated with the aid of FIGS. 6 and 7. FIG. 6 depicts a perspective view of the coupling prism 210 formed by the plurality of DR prisms 331-333. FIG. 7 depicts an exploded view of the coupling prism 210 of FIG. 6. Note that the coupling prism 210 as depicted in FIG. 6 is the first coupling prism 210a shown in FIG. 3A. Those skilled in the art will appreciate that corresponding details of the second coupling prism 210b can be easily derived according to the teaching regarding the first coupling prism 210a.

In FIGS. 6 and 7, a reference coordinate system with an x-direction 191, a y-direction 192 and a z-direction 190 is defined. Herein in the specification and appended claims, positional and directional words such as "above." "below." "higher." "upper." "lower." "top" and "bottom" are interpreted with reference to the z-direction 190.

Furthermore, the coupling prism 210 is formed with a substantially flat surface 638 such that the imaging sensor 220 overlies the substantially flat surface 638, thereby allowing the imaging sensor 220 to be conveniently positioned in parallel to the substantially flat surface 638 for receiving the multi-channel image 211. One advantage of forming the substantially flat surface 638 is that it allows formation of equally sharp single-channel images 251-253 for all channels in creating the multi-channel image 211.

The coupling prism 210 is formed by the DR prisms 331-333, denoted as a left DR prism 331, a central DR prism 333 and a right DR prism 332 as seen from FIGS. 6 and 7. The left, central and right DR prisms 331, 333, 332 receive the first, third and second single-channel images 251, 253, 252, respectively. In the left DR prism 331, an incoming first single-channel image 251a received through an image-receiving end surface 411 is reflected by an internal diagonal plane 418 towards an image-leaving end surface 412 to generate an outgoing first single-channel image 251b. In the right DR prism 332, an incoming second single-channel image 252a received through an image-receiving end surface 421 is reflected by an internal diagonal plane 428 towards an image-leaving end surface 422 to generate an outgoing second single-channel image 252b. In the central DR prism 333, as illustrated above, the incoming third single-channel image 253a received through the image-receiving end surface 431 is reflected by the internal diagonal plane 438 towards the image-leaving end surface 432 to generate the outgoing third single-channel image 253b. In forming the coupling prism 310 from the DR prisms 331-333, all the image-leaving end surfaces 412, 422, 432 of the DR prisms 331-333 are oriented along a same direction, viz., the z-direction 190, and aligned together on a same plane along the x-direction 191 for collectively creating the substantially flat surface 638 as well as collectively generating the multi-channel image 211 by spatially displaying the outgoing first, second and third sub-channel images 251b. 252b. 253b in parallel. Although all the image-leaving end surfaces 412, 422, 432 of the DR prisms 331-333 are required to be oriented along the same direction, the image-receiving end surfaces 411, 421, 431 thereof are not. The image-receiving end surfaces 411, 421, 431 are oriented according to arrival directions of the incoming first, second and third single-channel images 251a. 252a. 253a, respectively. Also note that the substantially flat surface 638 is formed by concatenating all the image-leaving end surfaces 412, 422, 432.

Preferably, the left, central and right DR prisms 331, 333, 332 are of same size and have a same shape of cube such that the three DR prisms 331-333 can be easily assembled to form the coupling prism 210, especially in forming the substantially flat surface 638. Although the three DR prisms 331-333 may be packed together by mechanically clamping the DR prisms 331-333 together, it is more preferable to glue the prisms 331-333 together by an adhesive so as to provide convenience in handling the resultant coupling prism 210 and assembling this coupling prism 210 with the imaging sensor 220 during manufacturing the apparatus 200. The adhesive may be a transparent one, an opaque one, or a black non-reflective one. Those skilled in the art may select an appropriate method of packing the DR prisms 331-333 together according to practical situations.

Depending on practical applications of the apparatus 200, the apparatus 200 may include various optical devices for assisting acquisition of the single-channel images 251-253 from the plurality of views 261-263 and for delivering the acquired single-channel images 251-253 to the coupling prism 210. Since the apparatus 200 is useful for implementing a HMD, these optical devices are described hereinafter with reference to HMD applications under an operational condition that the first and second views 261, 262 are eye views and that the third view 263 is a scene view.

Refer to FIG. 2. In certain embodiments, the apparatus 200 includes a plurality of light transmission devices 231, 232 and a plurality of collimating optical devices 236, 237. Although only two light transmission devices and two collimating optical devices are depicted in FIG. 2 for illustrating the apparatus 200, the present disclosure is not limited only to using these numbers of devices in the apparatus 200.

The plurality of light transmission devices 231, 232 is used for optically transmitting respective single-channel images 251, 252 from remote places to the coupling prism 210. Particularly, first and second light transmission devices 231, 232 are used to transmit the first and second single-channel images 251, 252 to the coupling prism 210. Consider the first light transmission device 231 as a representative case for illustrating different light transmission devices 231, 232. The first light transmission device 231 is used for optically transmitting the first single-channel image 251 from a remote location (the location of the first view 261) to the left DR prism 331. The first light transmission device 231 comprises a near end 241 and a distal end 242. The near end 241 is optically coupled to the image-receiving end surface 411 of the left DR prism 331. Hence, the first light transmission device 231 optically transmits the first single-channel image 251 from the distal end 242 to the near end 241 such that the first single-channel image 251 is receivable by the left DR prism 331.

For the plurality of collimating optical devices 236, 237, an individual collimating optical device is configured to capture a corresponding view selected from the plurality of views 261, 262 for forming a corresponding single-channel image to be transmitted on a respective light transmission device. It follows that the distal end of the respective light transmission is optically coupled to the individual collimating optical device. For instance, a first collimating optical device 236 captures the first view 261 to form the first single-channel image 251. The distal end 242 of the first light transmission device 231 is optically coupled to the first collimating optical device 236 such that the first light transmission device 231 receives the first single-channel image 251. A second collimating optical device 237 performs a similar function.

In implementation, an individual light transmission device in the plurality of light transmission devices 231, 232 may be realized by a surface relief waveguide, a volume holographic waveguide, or any waveguide determined appropriate by those skilled in the art. Alternatively, the individual light transmission device may be an optical fiber bundle.

As mentioned above, a collimating optical device may be a lens or a lens group. In certain embodiments, the individual collimating optical devices is realized by a first assembly of one or more lenses for capturing a respective view. Desirably and preferably, the first lens assembly is specifically designed for the respective view.

It is desirable to capture the first and second views 261, 262, which are the eye views, when the eyes are sufficiently illuminated. One approach of sufficiently illuminating the eyes while avoiding eye irritation caused by illumination is to use IR in illuminating the eyes. In certain embodiments, the apparatus 200 uses an IR light source 270 for generating IR light 271 to illuminate the first and second views 261, 262. The IR light source 270 may directly illuminate a desired view, e.g., the first view 261. Alternatively, the IR light source 270 may illuminate a desired view via an optical fiber. For instance, the IR light 271 is transmitted to the second view 262 through an optical fiber 274 connected to the IR light source 270. Optionally, the IR light source 270 may be realized with plural IR LEDS distributed around a desired view for achieving approximately uniform IR illumination over the desired view. For example, as the first view 260 is an eye, the IR LEDs are distributed around the eye so as to provide approximately uniform IR illumination to the eye. Optionally, instead of using only one IR light source, multiple IR light sources may be used to illuminate different views.

The third view 263, which is the scene view in front of the coupling prism 210, may be captured directly by the central DR prism 333 through the image-receiving end surface 431 thereof. Optionally, a third collimating optical device 238 is installed in front of, and is optically coupled to, the image-receiving end surface 431 for capturing the third view 263. The third collimating optical device 238 may be realized as a second assembly of one or more lenses.

The apparatus 200 is usable for implementing various embodiments of the disclosed HMD as elaborated as follows.

Figure 8:
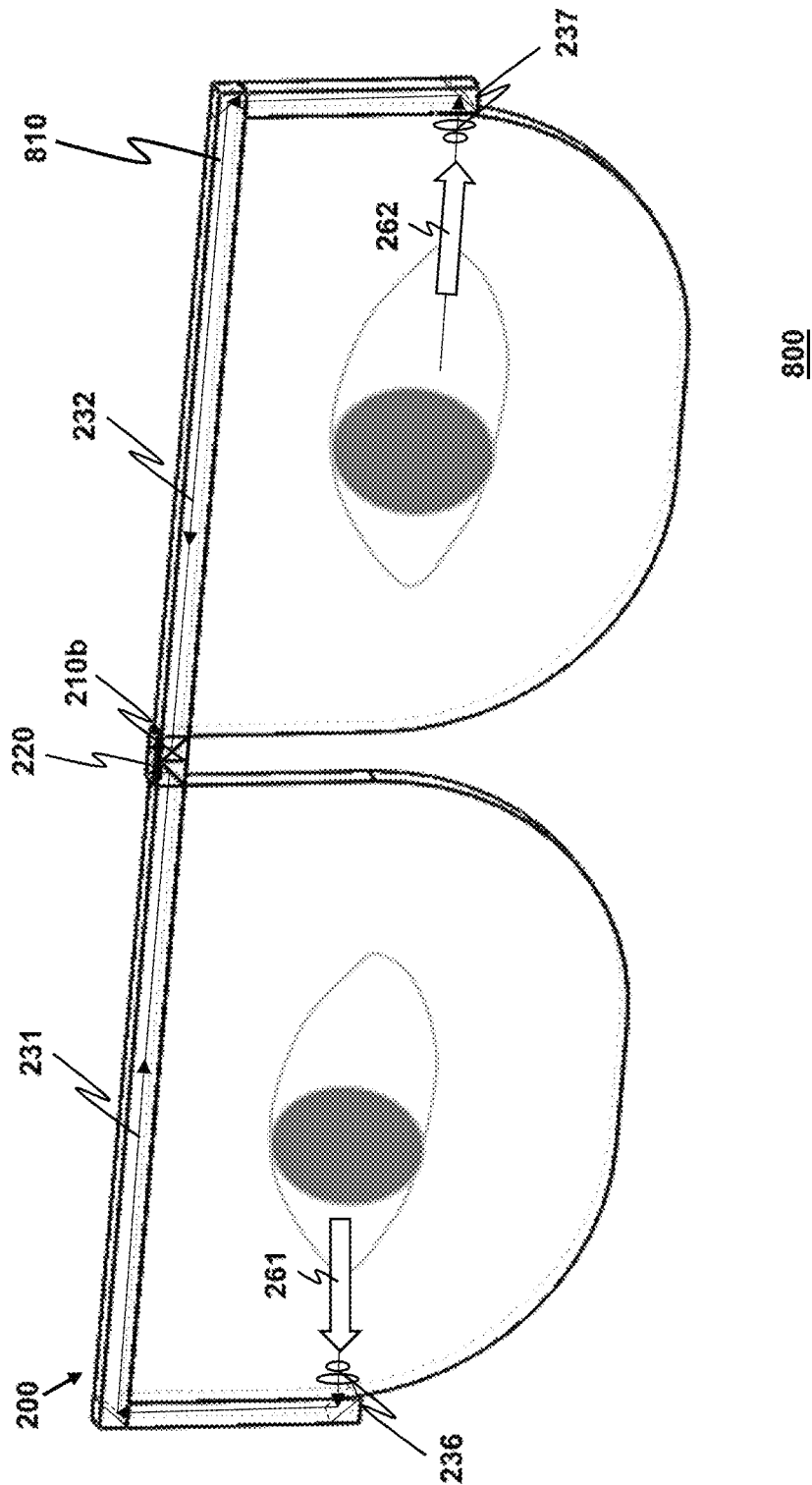
FIG. 8 depicts a first embodiment of a HMD as disclosed herein, where the first embodiment is installed with the disclosed apparatus for acquiring right- and left-eye views.

FIG. 8 depicts a first HMD 800 in the form of spectacles as a first embodiment of the disclosed HMD. The first HMD 800 comprises a sensing device 810 realized by the apparatus 200 for imaging plural eye views. Specifically, the first HMD 800 is implemented with the apparatus 200 used for acquiring the first view 261 (viz., a right-eye view 261) and the second view 262 (viz., a left-eye view 262). The apparatus 200 includes the first and second light transmission devices 231, 232, the first and second collimating optical device 236, 237, the imaging sensor 220, and the coupling prism 210 realized as the second coupling prism 210b as disclosed above. The need to use the first and second light transmission devices 231, 232 is because the right- and left-eye views 261, 262 are far from the coupling prism 210, which is located near a forehead of a wearer of the first HMD 800. Note that the first light transmission device 231 is optically coupled to the left DR prism 331, and the second light transmission device 232 is optically coupled to the right DR prism 332. The first and second collimating optical devices 236, 237 are used for capturing the right-eye view 261 and the left-eye view 262 to generate the first and second single-channel images 251, 252, respectively. Regarding application advantages, the first HMD 800 is capable of capturing signals from both eyes simultaneously, and provides a single sensor based, off-axis structure for dual-eye eye-gaze tracking.

Figure 9:
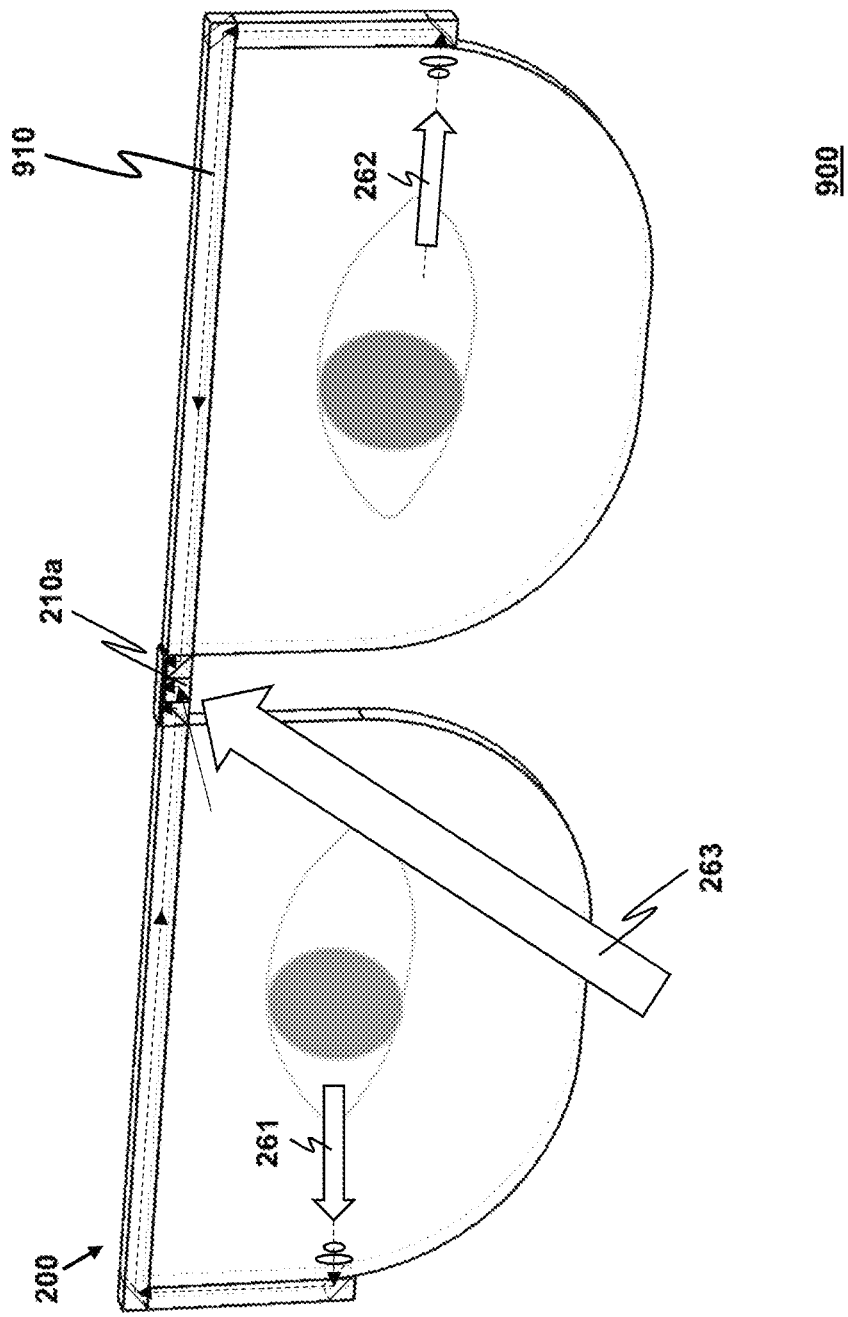
FIG. 9 depicts a second embodiment of the disclosed HMD, where the second embodiment is installed with the disclosed apparatus for internal sensing and external sensing by acquiring internal-sensing views of the two eyes and an external-sensing view of an environmental scene in front of the eyes.

FIG. 9 depicts a second HMD 900 as a second embodiment of the disclosed HMD. The second HMD 900 comprises a sensing device 910 realized by the apparatus 200 for imaging plural eye views and a scene view. Specifically, the apparatus 200 is used for internal sensing and external sensing by acquiring internal-sensing views of the two eyes (i.e. the right- and left-eye views 261, 262) and an external-sensing view of an environmental scene (i.e. the third view 263, referred to as a scene view 263) in front of the eyes. Note that the second HMD 900 performs all the functions of the first HMD 800 and further acquires the scene view 263. The apparatus 200 installed in the second HMD 900 is similar to the one installed in the first HMD 800 except that the first coupling prism 210a is used as the coupling prism 210. In the coupling prism 210, the image-receiving end surface 431 of the central DR prism 333 is used as an aperture to directly capture the scene view 263. Since the scene view 263 is a view located in front of the image-receiving end surface 431, the scene view 263 is also a prism-seeing view 263, which is a view seen from the coupling prism 210. The image-receiving end surface 411 of the left DR prism 331 is optically coupled to the first light transmission device 231 for receiving the first single-channel image 251. The image-receiving end surface 421 of the right DR prism 332 is optically coupled to the second light transmission device 232 for receiving the second single-channel image 252. Optionally, the third collimating optical device 238 (as shown in FIG. 2) is installed in front of the image-receiving end surface 431 of the central DR prism 333 for assisting the central DR prism 333 to capture the prism-seeing view 263. Regarding application advantages, the second HMD 900 is capable of capturing signals from both eyes simultaneously as well as capturing an external environmental scene, and provides a single sensor based, off-axis structure for dual-eye eye-gaze tracking with external-sensing capability.

Figure 10:
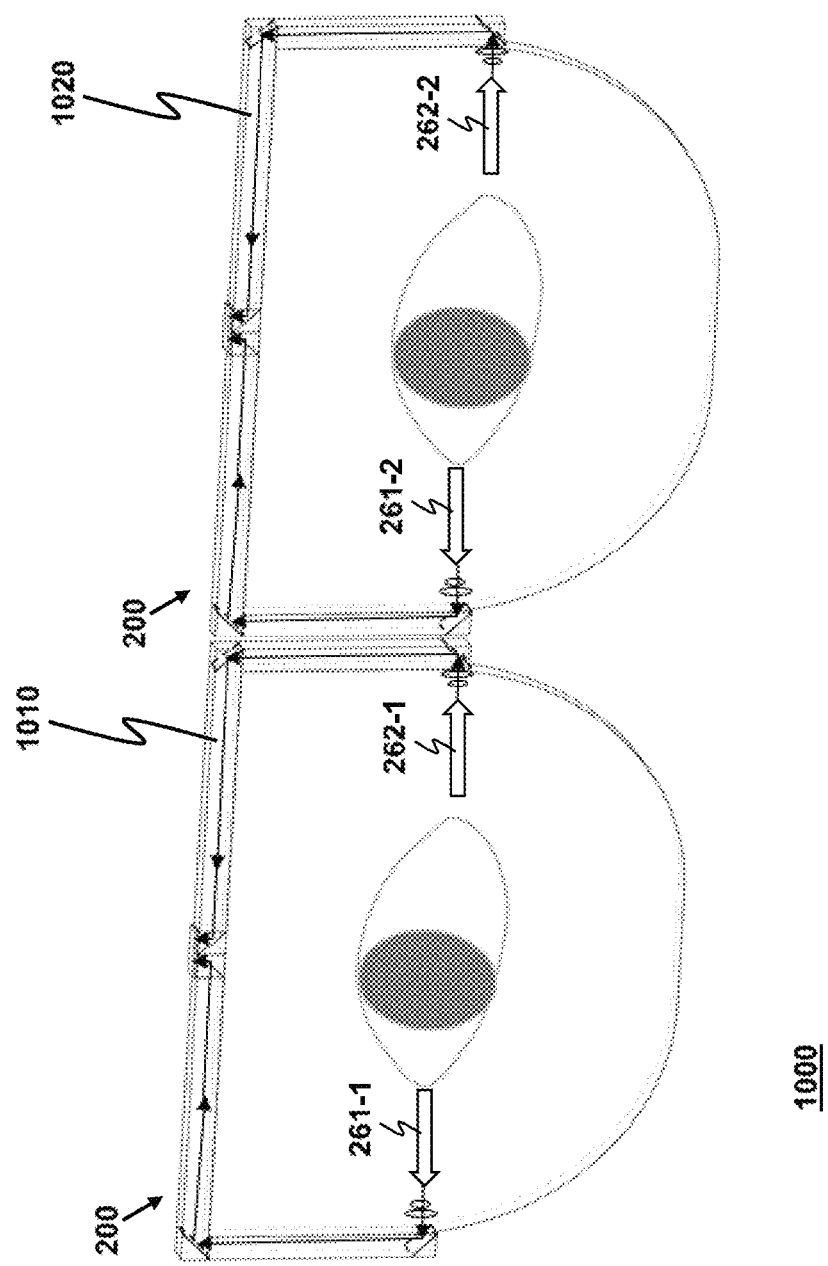
FIG. 10 depicts a third embodiment of the disclosed HMD, where the third embodiment is installed with two sets of the disclosed apparatus, each set being used for imaging a plurality of eye views of an eye viewed from different directions.

FIG. 10 depicts a third HMD 1000 as a third embodiment of the disclosed HMD. The third HMD 1000 comprises a first sensing device 1010 and a second sensing device 1020. The first sensing device 1010 is used for imaging a first plurality of eye views 261-1, 262-1 of a right eye viewed from different directions. The second sensing device 1020 is similarly used for imaging a second plurality of eye views 261-2, 262-2 of a left eye viewed from different directions. The first plurality of eye views 261-1, 262-1 may be advantageously used for 3D reconstruction of the right eye for internal sensing. Similarly, the second plurality of eye views 261-2, 262-2 is usable for 3D reconstruction of the left eye. Each of the first and second sensing devices 1010, 1020 is individually realized by the apparatus 200 under a configuration used in the first HMD 800. Regarding application advantages, the third HMD 1000 is capable of capturing signals from multiple angles of each eye. Each of the first and second sensing devices 1010, 1020 provides a single sensor based, off-axis structure for enhanced biometrics-sensing capability and high-accuracy eye-gaze tracking by constructing a 3D model of a respective eye.

Figure 11:
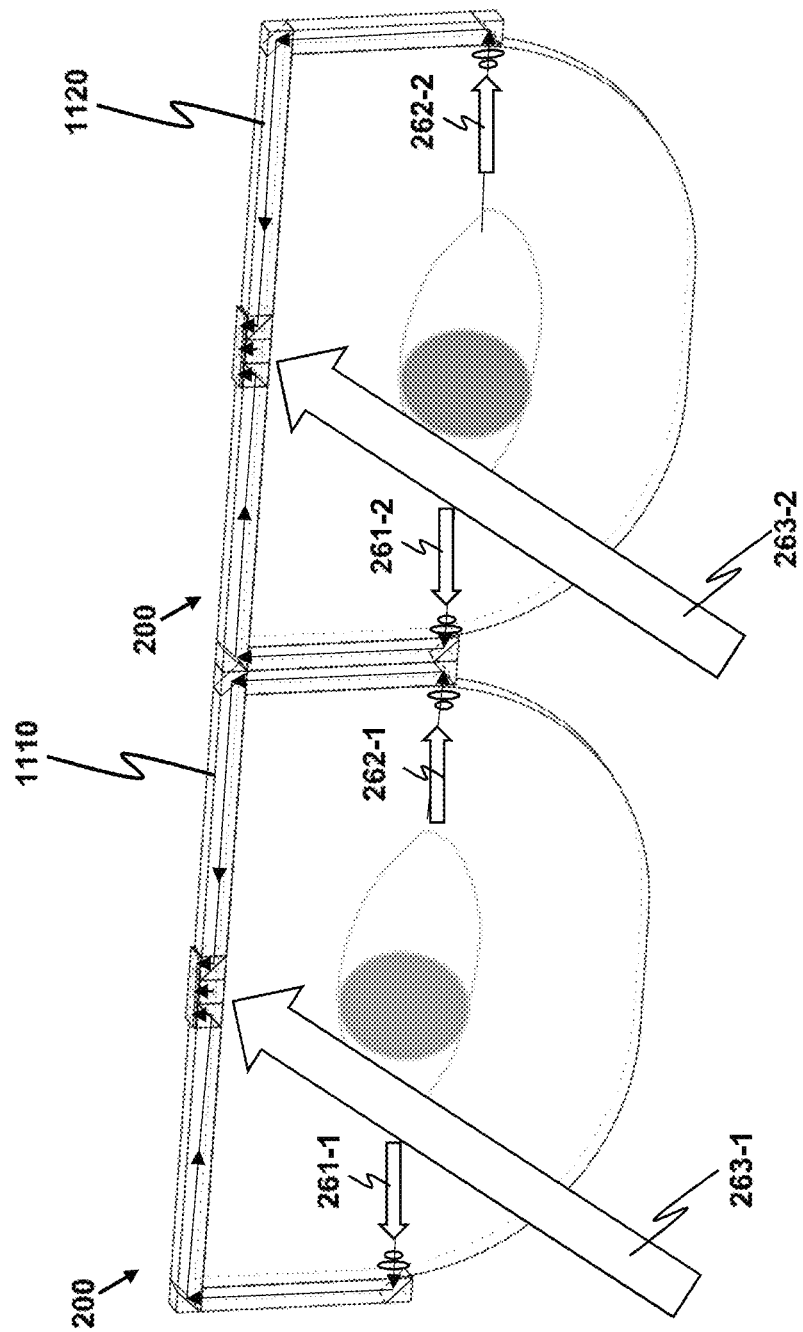
FIG. 11 depicts a fourth embodiment of the disclosed HMD, where the fourth embodiment is installed with two sets of the disclosed apparatus, each set being used for internal sensing and external sensing by acquiring internal-sensing views of a respective eye viewed from different directions and acquiring an external-sensing view of an environmental scene in front of the respective eye.

FIG. 11 depicts a fourth HMD 1100 as a fourth embodiment of the disclosed HMD. The fourth HMD 1100 comprises a first sensing device 1110 and a second sensing device 1120. The first sensing device 1110 is used for imaging a first plurality of eye views 261-1, 262-1 of a right eye viewed from different directions and for imaging a first scene view 263-1 visually seen from a first direction. The second sensing device 1120 is similarly used for imaging a second plurality of eye views 261-2, 262-2 of a left eye viewed from different directions and for imaging a second scene view 263-2 visually seen from a second direction different from the first direction. The first and second scene views 263-1, 263-2 may advantageously be used together for 3D image reconstruction of an environmental scene in external sensing. Each of the first and second sensing devices 1110, 1120 is individually realized by the apparatus 200 under a configuration used in the second HMD 900. Regarding application advantages, the fourth HMD 1100 is capable of capturing signals from multiple angles of each eye as well as capturing an external eye-watching zone. Each of the first and second sensing devices 1110, 1120 provides a single sensor based, off-axis structure for enhanced biometrics-sensing capability and high-accuracy eye-gaze tracking by constructing a 3D model of a respective eye. The fourth HMD 1100 also provides stereo external-sensing capability.

As mentioned above, optionally the apparatus 200 is included with the additional functionality of displaying the visible image 254. This additional functionality is realized by using the coupling prism 210 to reflect the visible image 254 originated from a micro display 225 towards an eye of a HMD wearer.

Figure 12:
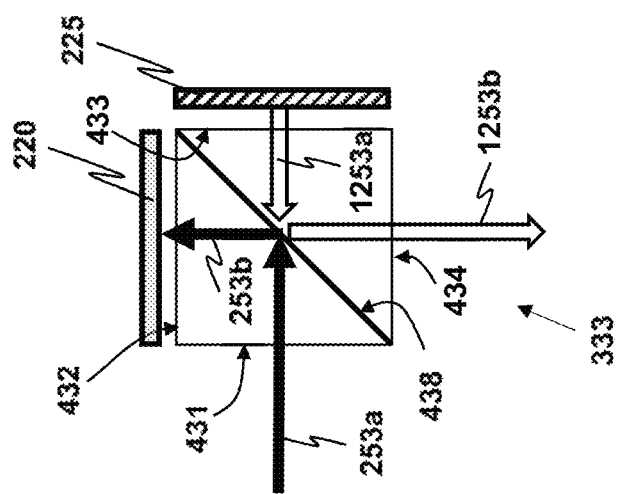
FIG. 12 redraws the side view of the exemplary DR prism of FIG. 4 for illustrating an application of the DR prism to redirect a visible image generated from a micro display towards an eye for viewing the visible image.

FIG. 12 redraws the side view of the DR prism 333 shown on FIG. 4 for illustrating an application of the DR prism 333 to redirect the visible image 254 towards the eye. In the DR prism 333, both sides of the internal diagonal plane 438 are at least partially reflective. One of the sides is used for reflecting the incoming third single-channel image 253a, and the other one of the two sides can be used to redirect the visible image 254. Denote an additional image-receiving end surface 433 as an end surface opposite to the image-receiving end surface 431, and an additional image-leaving end surface 434 as an end surface opposite to the image-leaving end surface 432. It follows that an additional incident image 1253a received through the additional image-receiving end surface 431 is reflected towards the additional image-leaving end surface 434 to generate an additional outgoing image 1253b. Note that the additional incident image 1253a is different from the incoming third single-channel image 253a. The micro display 225 for generating the visible image 254 overlies the additional image-receiving end surface 433 such that the additional incident image 1253a is the visible image 254. As a result, the DR prism 333 redirects the visible image 254 through reflection on the internal diagonal plane 438. Advantageously, the coupling prism 210, which includes the DR prism 333, performs a dual function of optically multiplexing the plurality of single-channel images 251-253 and redirecting the visible image 254 along a direction towards an eye. Note that the micro display 225 and the imaging sensor 220 are positioned on or over the end surfaces 433 and 432, respectively, where the two end surfaces 433, 432 are adjacent and perpendicular to each other.

Figure 13:
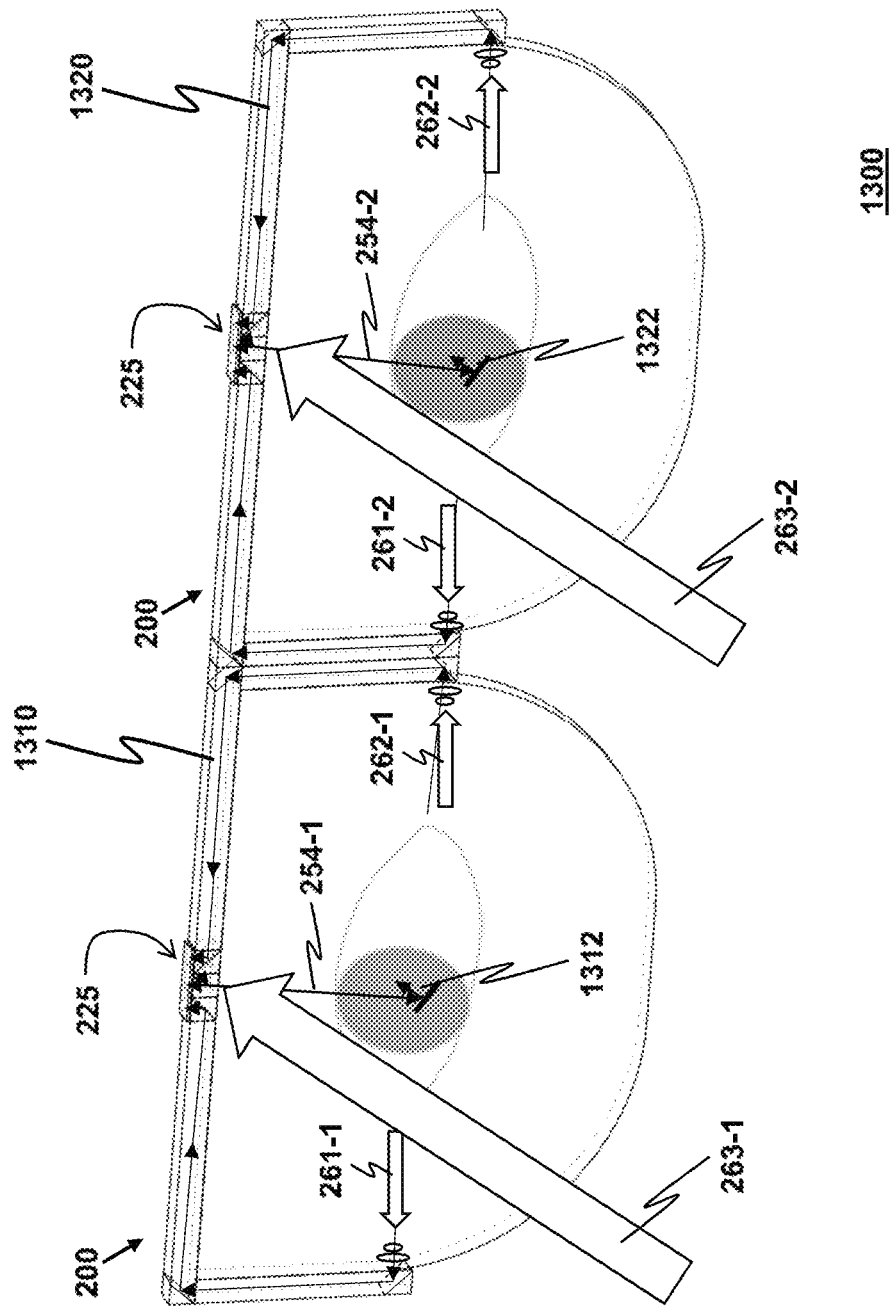
FIG. 13 depicts a fifth embodiment of the disclosed HMD, where the fifth embodiment is installed with two sets of the disclosed apparatus, each set being used for internal sensing and external sensing as well as for displaying a visible image.

FIG. 13 depicts a fifth HMD 1300 as a fifth embodiment of the disclosed HMD. The fifth HMD 1300 comprises a first integrated-sensing-and-displaying device 1310 and a second integrated-sensing-and-displaying device 1320. The first integrated-sensing-and-displaying device 1310 is used for imaging a first plurality of eye views 261-1, 262-1 of a right eye viewed from different directions and for imaging a first scene view 263-1 visually seen from a first direction. The second integrated-sensing-and-displaying device 1320 is similarly used for imaging a second plurality of eye views 261-2, 262-2 of a left eye viewed from different directions and for imaging a second scene view 263-2 visually seen from a second direction different from the first direction. The first and second scene views 263-1, 263-2 may advantageously be used together for 3D image reconstruction of an environmental scene in external sensing. In addition, the first and second integrated-sensing-and-displaying devices 1310, 1320 are configured to provide right-eye and left-eye visible images 254-1 and 254-2, respectively, for viewing by the user's eyes. The right-eye and left-eye visible images 254-1, 254-2 may collectively provide a 3D perception to the user in image viewing, enhancing viewing experience of the user. Each of the first and second integrated-sensing-and-displaying devices 1310, 1320 is individually realized by the apparatus 200 under a configuration of using the DR prism 333 of FIG. 12 and including the micro display 225 for generating a respective visible image 254-1 or 254-2. Furthermore, the fifth HMD 1300 is implemented with a first reflector 1312 and a second reflector 1322. The first reflector 1312 is arranged to be positioned in front of the right eye for reflecting the right-eye visible image 254-1 exited from the first integrated-sensing-and-displaying device 1310 towards the right eye. The second reflector 1322 is arranged to be positioned in front of the left eye for reflecting the left-eye visible image 254-2 exited from the second integrated-sensing-and-displaying device 1320 towards the left eye.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. An apparatus having at least a functionality of imaging a plurality of views for a head-mounted display, the apparatus comprising:
   a coupling prism for optically multiplexing plural single-channel images each created by capturing a respective view to thereby form a multi-channel image, the coupling prism comprising a plurality of diagonally-reflective (DR) prisms, respective DR prisms in the plurality of DR prisms being packed together, an individual DR prism being shaped as a rectangular cuboid having a plurality of end surfaces, the individual DR prism comprising an internal diagonal plane at least partially reflective for reflecting a respective single-channel image received through an image-receiving end surface of the individual DR prism towards an image-leaving end surface thereof, respective image-leaving end surfaces of the DR prisms being oriented to a same direction and aligned together on a same plane for collectively creating the multi-channel image and a substantially flat surface from which the multi-channel image exits the coupling prism; and
   an imaging sensor overlying the substantially flat surface for imaging the multi-channel image upon the multi-channel image exiting the coupling prism, thereby avoiding inter-channel interference caused by spillover of the single-channel images on the multi-channel image to occur while allowing a single imaging sensor instead of a plurality of imaging sensors to image the plurality of views.

2. The apparatus of claim 1, wherein the individual DR prism is shaped as a cube, and all the respective DR prisms in the plurality of DR prisms are of same size.

3. The apparatus of claim 1, wherein the individual DR prism comprises two right-angle prisms joined at hypotenuse faces thereof.

4. The apparatus of claim 1, wherein the individual DR prism is a beam splitter.

5. The apparatus of claim 1 further comprising:
   a plurality of light transmission devices, an individual light transmission device comprising a near end and a distal end, the near end being optically coupled to the image-receiving end surface of a corresponding DR prism selected from the plurality of DR prisms, the individual light transmission device being used for optically transmitting a corresponding single-channel image intended for reception by the corresponding DR prism from the distal end to the near end such that the corresponding single-channel image is receivable by the corresponding DR prism; and
   a plurality of collimating optical devices, the distal end of the individual light transmission device being optically coupled to a respective collimating optical device configured to capture a corresponding view selected from the plurality of views for forming the corresponding single-channel image.

6. The apparatus of claim 5, wherein the individual light transmission device is realized by a waveguide.

7. The apparatus of claim 5, wherein the individual light transmission device is an optical fiber bundle.

8. The apparatus of claim 1 further comprising:
an infrared (IR) light source for generating IR light to illuminate one or more views selected from the plurality of views.

9. The apparatus of claim 8 further comprising:
an optical fiber connected to the IR light source for transmitting the IR light to one of the selected one or more views.

10. The apparatus of claim 5, wherein the respective collimating optical device is a first assembly of one or more lenses for capturing the corresponding view.

11. The apparatus of claim 5, wherein:
a first certain DR prism in the plurality of DR prisms is dedicated to capture a prism-seeing view, the prism-seeing view being a view located in front of the image-receiving end surface of said first certain DR prism; and
remaining DR prisms in the plurality of DR prisms other than said first certain DR prism are optically coupled to respective light transmission devices.

12. The apparatus of claim 11 further comprising:
a second assembly of one or more lenses optically coupled to the image-receiving end surface of said first certain DR prism for capturing the prism-seeing view.

13. The apparatus of claim 11 further comprising:
a micro display for generating a visible image such that the apparatus has an additional functionality of displaying the visible image, the micro display overlying an additional image-receiving end surface of a second certain DR prism selected from the plurality of DR prisms, whereby the visible image received by said second certain DR prism is reflected towards an additional image-leaving end surface of said second certain DR prism, wherein in said second certain DR prism, the additional image-receiving end surface is opposite to the image-receiving end surface, and the additional image-leaving end surface is opposite to the image-leaving end surface.

14. A head-mounted display wearable by a user, the head-mounted display comprising:
a sensing device for imaging eye views, the sensing device being realized by the apparatus of claim 5.

15. A head-mounted display wearable by a user, the head-mounted display comprising:
a first sensing device for imaging a first plurality of eye views from a right eye of the user; and
a second sensing device for imaging a second plurality of eye views from a left eye of the user:
wherein each of the first and second sensing devices is individually realized by the apparatus of claim 5.

16. A head-mounted display wearable by a user, the head-mounted display comprising:
a sensing device for imaging eye views and a scene view, the sensing device being realized by the apparatus of claim 11.

17. A head-mounted display wearable by a user, the head-mounted display comprising:
a first sensing device for imaging a first plurality of eye views from a right eye of the user, and a first scene view visually seen from a first direction; and
a second sensing device for imaging a second plurality of eye views from a left eye of the user, and a second scene view visually seen from a second direction different from the first direction;
wherein each of the first and second sensing devices is individually realized by the apparatus of claim 11, the first and second scene views being a respective prism-seeing view.

18. A head-mounted display wearable by a user, the head-mounted display comprising:
a first integrated-sensing-and-displaying device for imaging a first plurality of eye views from a right eye of the user, and a first scene view visually seen from a first direction, and for displaying a first visible image to the right eye; and
a second integrated-sensing-and-displaying device for imaging a second plurality of eye views from a left eye of the user, and a second scene view visually seen from a second direction different from the first direction, and for displaying a second visible image to the left eye;
wherein:
each of the first and second integrated-sensing-and-displaying devices is individually realized by the apparatus of claim 13, the first and second scene views being a respective prism-seeing view; and
the head-mounted display further comprises:
a first reflector arranged to be positioned in front of the right eye for reflecting the first visible image exited from the additional image-leaving end surface of the first integrated-sensing-and-displaying device towards the right eye; and
a second reflector arranged to be positioned in front of the left eye for reflecting the second visible image exited from the additional image-leaving end surface of the second integrated-sensing-and-displaying device towards the left eye.

* * * * *